Nov. 7, 1961  J. R. GAMMETER  3,007,195
APPARATUS FOR STRIPPING THIN RUBBER ARTICLES FROM A FORM
Original Filed Jan. 24, 1951  3 Sheets-Sheet 1

INVENTOR.
John R. Gammeter
BY
William Cleland
ATTORNEY

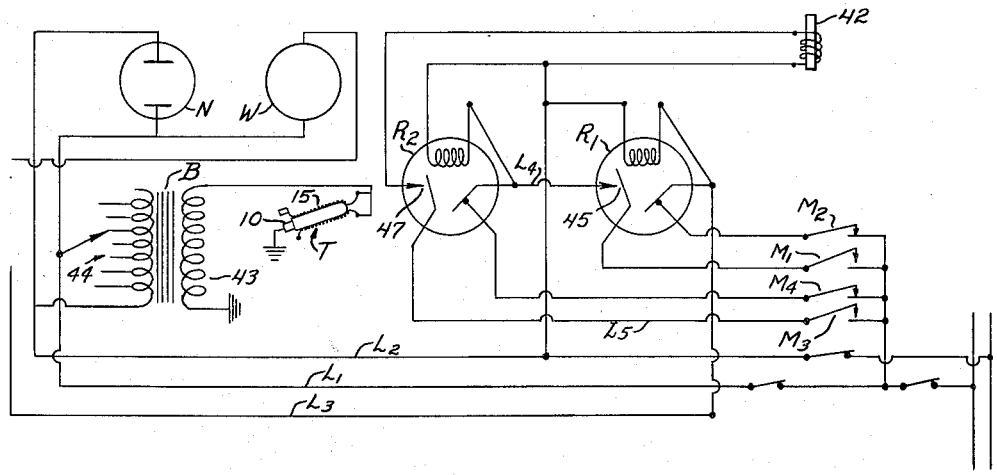
FIG. 3
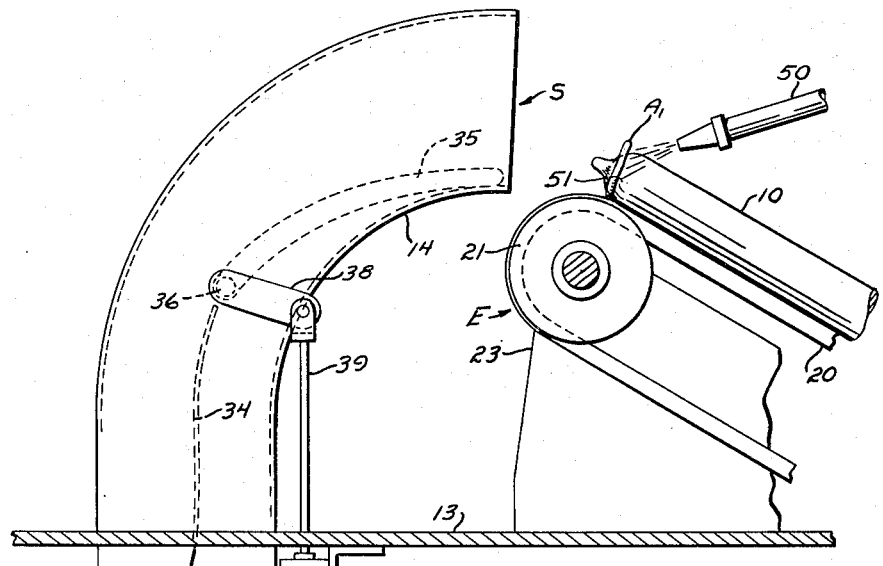
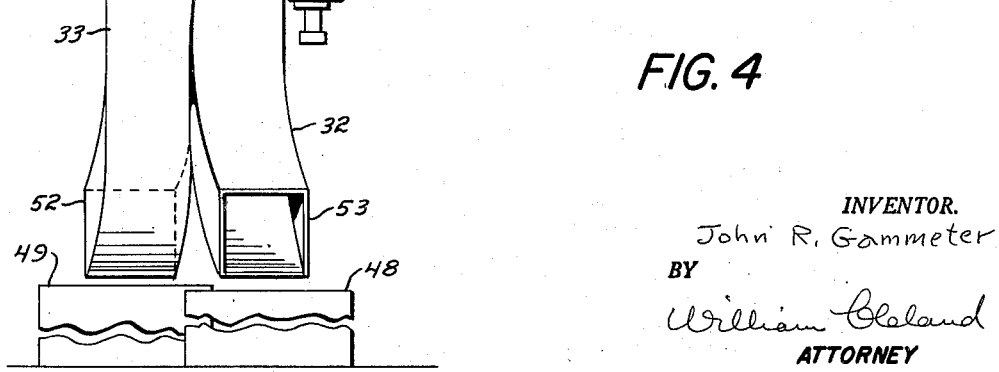
FIG. 4
INVENTOR.
John R. Gammeter
BY
William Cleland
ATTORNEY

United States Patent Office 3,007,195
Patented Nov. 7, 1961

3,007,195
APPARATUS FOR STRIPPING THIN RUBBER ARTICLES FROM A FORM
John R. Gammeter, Akron, Ohio, assignor, by mesne assignments, to Mary Jane Thomas
Original application Jan. 24, 1951, Ser. No. 207,547, now Patent No. 2,714,451, dated Aug. 2, 1955. Divided and this application Apr. 19, 1955, Ser. No. 502,486
2 Claims. (Cl. 18—2)

This invention relates to apparatus for sorting articles, and in particular to apparatus for sorting thin, hollow rubber articles, such as prophylactics, after the same have been tested for defects.

This is a divisional application carved from application Serial No. 207,547, filed on January 24, 1951, and which issued into Patent No. 2,714,451 on August 2, 1955.

In Gammeter Patent No. 2,221,323, there is disclosed a machine by which dipped rubber articles received on moving forms of electro-conductive material are electrically tested for imperviousness, by rolling the forms against a flexible, electro-conductive element, whereby defects in the articles are electrically manifested by passage of an electrical current from the flexible element through perforations or thin spots in the goods, to the forms. In Gammeter Patent No. 2,371,818 there is shown a satisfactory device for removing the articles from the forms after the same have been tested on such an electrical tester, but this article-removing device removed all good articles remaining on forms upon passing over the device, and required provision of separate means for removing pervious or otherwise imperfect articles from the forms, as manifested by the electrical tester. The first-named Gammeter patent teaches the use of air-blowing the imperfect articles from the forms, but this required provision of air passages in the forms, opening at the ends of the same, with a resultant reduction in the efficiency of the electrical testing procedure.

One object of the present invention is to provide an improved unitary device for sorting articles of the character described into separate classifications as the same are received by the device from a given point, thereby obviating the necessity for having separate article take-off units for articles of different classifications.

Another object of the invention is to provide in testing apparatus of the character described, improved article take-off means which does not reduce the efficiency of the testing operation.

Another object of the invention is to provide improved article take-off means of the character described which will effectively roll thin, hollow rubber articles of the character described on testing forms thereof and which will eject the articles from the forms without unrolling the same.

These and other objects of the invention will be manifest from the following brief description and the accompanying drawings.

Of the accompanying drawings:

FIGURE 3 is a schematic wiring diagram, illustrating electrical control means for the testing machine.

FIGURE 4 is a vertical cross-section, similar to FIGURE 2, illustrating a modification of the invention.

Figure 1:
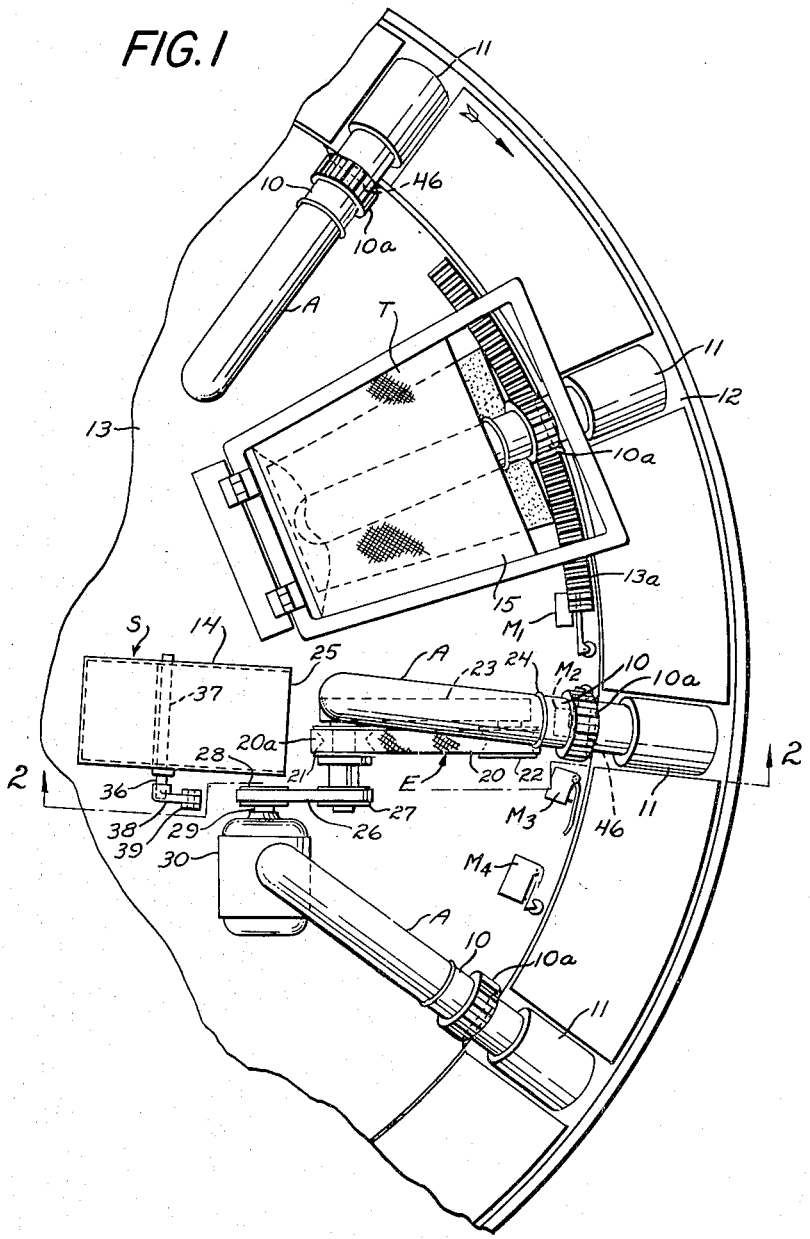
FIGURE 1 is a fragmentary top plan view of an electrical testing machine, illustrating units thereof for testing, ejecting, and sorting thin rubber articles.
Figure 2:
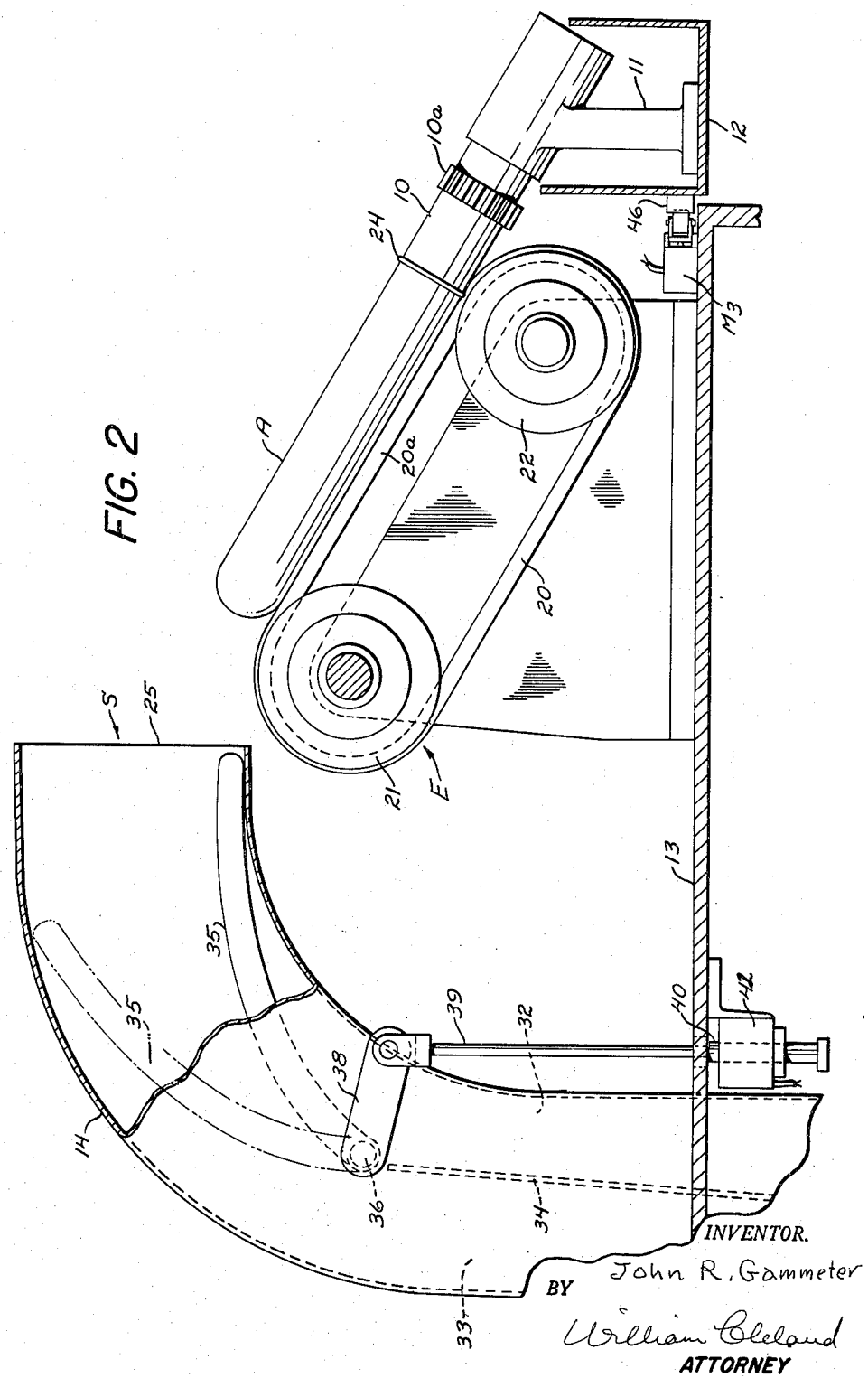
FIGURE 2 is a vertical cross-section, on an enlarged scale, taken substantially on the line 2—2 of FIGURE 1.

Referring particularly to FIGURES 1 and 2 of the drawings, the numerals 10, 10 designate a plurality of elongated metal forms supported on mountings 11, 11 peripherally spaced on an annular conveyor or plate 12, the forms being rotatable about longitudinal axes thereof and extending freely radially inwardly of the conveyor. The conveyor is mounted to be rotatable in a horizontal plane about a fixed circular table 13, in clockwise direction as viewed in FIGURE 1, to convey the forms 10 in succession through an electrical testing unit T which manifests defects, such as perforations or thin spots in dipped rubber articles on the forms, and to convey the forms past an article-ejecting unit E in cooperating relationship to a funnel or receptacle 14 of an article-sorting unit S, mounted on table 13. A suitable power driven mechanism, such as is shown in said prior Patent No. 2,221,323, is provided for rotating the conveyor. The forms 10 are cylindrical and rounded at the free ends of the same to receive thereon correspondingly shaped thin rubber prophylactics, in distended unwrinkled condition.

For electrically testing the articles A, the forms 10 containing the same are moved in succession, as described, under a draped flexible, electro-conductive element 15, such as fine wire mesh fabric of the type used for ladies' handbags, each form while so engaging the element being rotated against the same by engagement of a pinion 10a thereon with an arcuate toothed rack 13a on the fixed table 13. The mesh element 15 and the respective forms are suitably connected in an electrical circuit (see FIGURE 3) providing a source of high potential current (say 1200 volts), the circuit being normally open by presence of a dielectric thin rubber article interposed between its form and the mesh element. Presence of a "pin hole" or perforation, or a thin spot in an article, however, is manifested by closing of the electrical circuit through the same to operate suitable electrical control means, such as is shown in FIGURE 3, including an electromagnet 42 of the article-sorting unit S, and a series of cam-operated switches, to be described in further detail later.

The article-ejecting unit E may be of a suitable type, such as is shown in said Patent No. 2,371,818. Accordingly, a fabric reinforced rubber V-belt 20 is extended between spaced pulleys 21 and 22 rotatably mounted on a bracket 23 to have an elongated, substantially straight upper reach of the belt positioned in the arcuate path of the lower portions of the forms 10, the belt being driven to move said upper reach thereof inwardly and thereby engage the articles lengthwise to strip the same from the respective forms. When the articles A are provided with integral reinforcing bead rings 24, the belt may be driven at desired linear speed with relation to the speed of the conveyor to engage the rings 24 and roll the articles upon themselves toward the free inner ends of the forms, and finally to eject the rolled article into the outwardly presented open mouth 25 of funnel 14. Efficient removal of the articles from the forms is assured by arrangement of the upper reach 20a of belt 20 to be at a slight angle to the longitudinal axes of the forms in the article-ejecting positions (see FIGURES 1 and 2) thereof.

The belt 20 may be driven as described, by a belt 26 between a pulley 27, keyed on the same shaft as pulley 21, and a pulley 28 on the output shaft 29 of a motor 30, which for the present purposes may be continuously running. Bracket 23 is shown suitably constructed for adjusting the position of the upper reach of belt 20 for correct engagement with the forms.

As all articles A will be stripped from the respective forms 10 passing over the V-belt 20, and projected into the funnel 14 of unit S, the latter is provided with improved means for separating the "good" articles from imperfect articles as manifested by the tester T. Accordingly, the funnel, rearwardly of the mouth 25 thereof, may be rectangular in cross-section and divided into two separate front and rear channels or compartments 32 and 33, as by a wall 34, for reception of "bad" and "good" articles, respectively, the inlet ends of the respective compartments being below or closely adjacent the lower edge of the mouth of the funnel, and the lower or outlet ends of the compartments terminating divergently to open into separate portable containers resting on the floor and adapted to contain predetermined quantities of the separated articles (see FIGURE 4).

For separating the ejected articles into the respective compartments 32 or 33, a rectangular deflector plate or closure member 35 is hinged at the top of the dividing wall 34, to be swingable from a position (shown in full lines in FIGURE 2), in which it closes off the forward compartment, the plate in the forward position being supported at a downward and inward inclination, with the forward or free edge thereof against the lower edge portion of the mouth 25 of the funnel, to deflect the "good" articles into the rear compartment, and in a rear position being supported against the rear wall of the funnel for deflecting the "bad" articles into the forward compartment. For swinging the deflector plate between these two positions, an outward extension 36 of a pivotal shaft 37 thereof has fixed thereon an arm 38, to which is pivoted an extension 39 of a movable armature 40 of a solenoid or electromagnet 42, mounted on the underside of fixed table 13. Deflector plate 35 may be of non-static material, such as redwood, "Micarta" phenolic resin or it may be covered with such non-static material, to obviate electrostatic attraction of the rubber articles A thereto which might interfere with efficient movement of the articles within the funnel.

Operation of the improved sorting apparatus for testing thin rubber articles, such as prophylactics A applied to the metal forms 10 in known manner, will be described specifically by reference to the wiring diagram of FIGURE 3, in conjunction with the drawings generally.

In normal operation of the testing machine, a pair of conventional electronic relays $R_1$ and $R_2$, connected in the wiring circuit shown in FIGURE 3, have contacts 45 and 47, respectively, thereof in open condition. The contacts 45 and 47 remain open as long as "good" articles are passing under the net 15 of the electrical testing unit T (see FIGURES 1 and 3). These relays, therefore, will not be effective to operate the electromagnet 42 of sorting unit S (see FIGURES 2 and 3). There will be 110 volts connected to a primary side 44 of a transformer B at all times, through lines $L_1$ and $L_2$, as indicated by a neon lamp N. There will also be current supplied to various parts of the wiring circuit, but such current is normally insufficient to energize coils in the relays $R_1$ and $R_2$, or a "bad" goods flasher signal (FIGURE 3). Should a form 10 containing a "bad" article A pass under the net 15, however, the net is grounded through the "bad spot" to the form and through a secondary side 43 of the transformer B, the voltage on said primary side 44 being preset according to the type or thickness of an article A being tested (as an example to produce a surge of 750 volts A.C. for each .001 inch of thickness of the article).

Closing of the secondary side 43 of the transformer in this manner sets off the primary side 44 thereof (110 volt side), which is variable in accordance with the thickness of the articles, thereby creating a temporary surge of current which, through lines $L_1$ and $L_3$, momentarily lights up a signal lamp W acting as a resistance and indicates that a "bad" article has passed from the testing unit, and energizes the coil of the first relay or activating means $R_1$ at the same time, through lines $L_1$ and $L_3$, thereby magnetically locking the contact 45 in closed position to the left (FIGURE 3). As the article form A under consideration leaves the net 15 and another form is about to move under the same it becomes necessary to open the contact 45 of first relay $R_1$ for a subsequent independent test of the article on another form A. Accordingly, a cam 46 prelocated on the conveyor 12 (see FIGURE 2) to be opposite to the form of the tested article (there being one such cam for each form), engages and closes a normally open micro-switch $M_1$, which is the first of a series of four micro-switches mounted on the fixed table 13, in predetermined circumferentially spaced relation (see FIGURE 1), the upper reach 20a of the belt 20 of the ejecting unit E being substantially aligned with the effective cam-engaging point of the third, normally open, micro-switch $M_3$ of the series (see FIGURE 1. Thus, closing the first, normally open, micro-switch $M_1$ of the series, through lines $L_1$ and $L_4$, energizes the coil of a second relay or holding means $R_2$ in the compound circuit, thereby magnetically locking a contact 47 thereof in closed position to the left (FIGURE 3), which holds a source of current through contact 47 in readiness for subsequent ejecting and sorting operations independently of a testing operation on the next succeeding form passing through the testing unit T. Immediately before the tested from moves into contact with the moving belt 20 of the ejecting unit E (FIGURES 1 and 2), the cam 46 momentarily operates the second, normally closed, micro-switch $M_2$ of said series to open the line through the same, and thereby deenergizes and opens the first relay $R_1$ for said next succeeding test, switch $M_1$ being held closed by the same cam until switch $M_2$ has been fully opened by cam 46.

The form 10 with tested article A thereon is conveyed into contact with said upper reach of moving belt 20, thereby to roll article A from the end of the form and eject it toward the mouth 25 of funnel 14. Simultaneously with such ejection of tested article A the cam 46 engages and closes the normally open third micro-switch $M_3$ of said series of cams and thereby, through the previously closed contact 47 of the holding relay $R_2$ and lines $L_5$ and $L_1$, to close a circuit to the solenoid 42. Energization of the solenoid 42 moves the armature 40 thereof and extension arm 39 to pivot arm 38 with shaft 36 (FIGURE 2), thereby to swing the deflector plate 35 from the full line or "good" goods position shown in FIGURE 2 to the "bad" goods position shown in chain-dotted lines. The ejected article is thus deflected into the forward compartment 32 of the funnel and conveyed to the removable "bad" goods container 48, (see FIGURE 4). The same (third) switch $M_3$ may be utilized for operating other article ejecting devices than that shown herein, such as the air-blast type ejector means shown in prior Gammeter Patent No. 2,221,323.

Immediately upon the defective article being ejected from its form as described, the cam 46 will engage the fourth (normally closed) micro-switch $M_4$, to open the same and thereby deenergize the coil of holding relay $R_2$ to open contact 47 thereof, ready for the next or any succeeding form containing goods which has been manifested as being "bad" by the testing unit T. The weight of the deflector plate and other movable parts between the same and the electromagnet will cause the deflector to return to said "good" goods position immediately upon deenergization of the electromagnet 42 in which position the articles are ejected by belt 20 into the funnel compartment 33 and received in a container 49.

As all tested articles A are ejected into the funnel 14, additional untested articles A may be applied to the bare forms 10 immediately after they pass the funnel, for testing on the same or a different testing unit T.

A bare form passing under the tester T will merely operate the circuit to operate the sorting unit S as described above.

In other words, and more briefly stated, the first relay $R_1$ temporarily manifests the presence of a defective article on a given form passing through the testing unit T and the second relay $R_2$ holds potential current in the circuit to the electromagnet 42 ready for energization of the electromagnet at a later time, that is, when the third micro-switch is closed substantially simultaneously with ejection of the article toward funnel 14. The four micro-switches $M_1$, $M_2$, $M_3$, and $M_4$ are operated by a cam 46 associated with a given form 10 containing a tested thin rubber article A, in timed sequence with movement of the form conveyor, to set the relays $R_1$ and $R_2$ for the purposes previously described.

Thus, has been provided efficient and effective apparatus for testing, stripping, and sorting thin rubber articles, which does not require separate take-off and article-receiving units in different locations on the testing machine for handling the two classes of goods.

Referring now to FIGURE 4, there is shown a form of the invention in which the article-ejecting and article-sorting units are substantially as before, like parts, therefore, being given like designations unless otherwise noted. The apparatus, however, includes improved means for assisting the ejection of thin rubber articles of the type having reduced hollow tips on the ends thereof, which have had a tendency to adhere to the reduced end of similarly shaped forms and thereby to unroll at the end of the take-off. This unrolling of the articles has required separate operations to reroll the same to flat compact size for packaging.

Accordingly, at the point when an article $A_1$, on a form 10 which has barely passed over the belt 20 of the ejecting unit E has been substantially completely rolled upon itself by said belt, as shown in full lines in FIGURE 4, a nozzle 50 is operated to direct a blast of air axially behind the rolled edge of the article, and between the reduced tip 51 of the form and the nippled end of the article, as shown. This assists ejection of the article axially outwardly of the end of the form and into funnel 14, without unrolling the article. The airblast for this purpose may be supplied from a suitable source of compressed air (not shown), through a solenoid operated air valve (not shown), either cam actuated by the microswitch $M_3$, or by a separately cam-operated switch. Without the air-blast from nozzle 50, or equivalent means, the rolled articles have a tendency to cling to the tips 51 of the forms and thereby miss being ejected into the funnel.

The ejecting and sorting apparatus of FIGURE 4 otherwise operates as described above in connection with FIGURES 1 to 3, the "good" and "bad" goods being deposited from outlet ends 52 and 53 of the funnel compartments 33 and 32 into suitable containers 49 and 48.

Other modifications of the invention may be resorted to without departing from the spirit thereof or the scope of the appended claims.

What is claimed is:

1. Apparatus for removing thin rubber articles from forms thereof wherein the articles are of the character described having an open end and provided with a closed opposite end, comprising at least one form corresponding substantially to the shape and size of the articles, means for supporting said form to extend freely, means for continuously conveying said forms sidewise to move a longitudinal edge portion thereof along a path, an endless belt having a reach thereof extending in said path and in the direction of a longitudinal axis of the sidewise moving form to be engageable by said longitudinal edge portion thereof, means for moving said belt in said longitudinal direction against the edge portion of the sidewise moving form initially to engage the article adjacent the open end of the same and then toward the closed end to roll the article upon itself to the free end portion of the form, auxiliary ejection means having an air outlet, and control means connected to a source of pressurized air and coordinated with said movement of the form to supply a blast of pressurized air through said air outlet at the point when said article is rolled at said free end portion of the form, said air outlet being presented in direction axially outwardly of said free end portion of the form, whereby said blast of air engages between said free end portion of the form and the corresponding end portion of the article to remove the rolled article axially outwardly away from the form.

2. Apparatus for removing thin rubber articles from forms thereof wherein the articles are of the character described having an open end and provided with a closed opposite end, comprising at least one form corresponding substantially to the shape and size of the articles, means for supporting said form to extend freely inwardly, means for continuously conveying said forms sidewise to move a longitudinal edge portion thereof along a path, an endless belt having a reach thereof extending in said path and in the direction of a longitudinal axis of the sidewise moving form to be engageable by said longitudinal edge portion thereof, means for moving said belt in said longitudinal direction against the edge portion of the sidewise moving form initially to engage the article adjacent the open end of the same and then toward the closed end to roll the article upon itself to the free end portion of the form, auxiliary ejection means including a relatively fixed nozzle having a pressure fluid outlet adapted to be presented axially toward the free end portion of the form and to be axially inwardly spaced from the edge of the article when rolled substantially to the said free end portion of the form, and control means coordinated with movement of the sidewise conveyed form for supplying a blast of pressure fluid through said nozzle outlet at the point when said article is rolled at said free end portion of the form, whereby said blast of air engages between said free end portion of the form and the corresponding end portion of the article to remove the rolled article axially outwardly away from the form.

References Cited in the file of this patent
UNITED STATES PATENTS

| | | |
|---|---|---|
| 1,923,733 | Killian | Aug. 22, 1933 |
| 2,221,711 | Kurkjian | Nov. 12, 1940 |
| 2,317,839 | Westin | Apr. 27, 1943 |
| 2,371,818 | Gammeter | Mar. 20, 1945 |
| 2,609,094 | Fry | Sept. 2, 1952 |